United States Patent Office 3,117,119
Patented Jan. 7, 1964

3,117,119
CYCLOALIPHATIC PENICILLIN DERIVATIVES
Alfred W. Chow, Merchantville, N.J., and John R. E. Hoover, Glenside, Pa., assignors to Smith Kline & French Laboratories, Philadelphia, Pa., a corporation of Pennsylvania
No Drawing. Filed Nov. 13, 1962, Ser. No. 237,385
6 Claims. (Cl. 260—239.1)

This application is a continuation-in-part of our copending application Serial No. 85,962, filed January 31, 1961 now abandoned.

The invention described herein pertains to novel organic compounds possessing valuable chemotherapeutic activity and more specifically to a new class of antimicrobial agents.

In general, the compounds of our invention demonstrate a high level of antimicrobial activity against such organisms as penicillin resistant *Staphylococcus aureus*, *Diplococcus pneumoniae*, and *Proteus vulgaris*, and furthermore, manifest certain other advantageous properties such as prolonged stability and a surprisingly low incidence of side effects. They are accordingly useful in the treatment of various antimicrobial infections and may be administered to the infected host in any of the usual forms, such as for example, solutions, suspensions, creams, ointments, tablets, capsules and the like as well as being suitable for oral, injectable or topical application, depending upon the nature of the particular infection. Certain of our compounds are also useful as feed additives for livestock.

The structure of our novel compounds may be represented by the following formula:

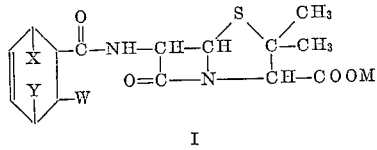

I wherein M is hydrogen or pharmaceutically acceptable cations; W is hydrogen, lower alkyl or phenyl; X is hydrogen, lower alkyl, phenyl, or, when taken with group Y, methylene and 2-propylidene; Y is hydrogen, or, when taken together with X, methylene and 2-propylidene, at least one of W, X and Y being a group other than hydrogen.

By the terms lower alkyl or lower alkanoyloxy is meant a group embracing a branched or straight chained hydrocarbon group of from 1 to 6 carbon atoms.

Also embraced within the scope of the present invention are the nontoxic pharmaceutically acceptable salts of the above penicillin derivatives. The cations comprised in these salts and embraced by M include for example, the sodium ion, potassium ion, calcium ion, aluminum ion, the organic amine cations, such as the ion form of the lower alkyl amine groups, e.g., triethylammonium, as well as procaine, chloroprocaine, N,N' - dibenzylethylenediamine, N,N'-bis-(dehydroabietyl)-ethylenediamine, and N-methyl-1,2-diphenyl-2-hydroxyethylamine.

The compounds of our invention are cyclohexene carboxylic acid derivatives and bicyclo-[2.2.1]-cycloheptene carboxylic acid derivatives of 6-aminopenicillanic acid and are prepared by treating 6-aminopenicillanic acid:

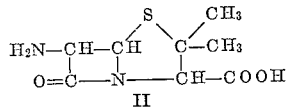

II or a salt thereof, such as the triethylamine salt, with a mixed anhydride or acid chloride of the appropriate cyclohexene or bicyclo-[2.2.1]-cycloheptene carboxylic acid. In the case of employing the mixed anhydride this compound is obtained by treating the appropriate acid with a lower alkyl chloroformate, such as for example, ethylchloroformate.

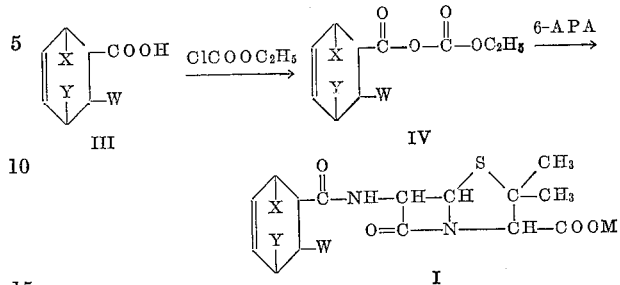

Figure 1

Preferably the acid chlorides of the above acids embraced by Formula III are reacted with 6-APA to yield the desired products.

We have found that the cyclic structures of Formula I demonstrate the property of improved enzme resistance without appreciably effecting the antimicrobial activity of the final product. This property of improved enzyme resistance manifests itself through activity against certain strains of microorganisms which heretofore have been resistant to most known penicillins, presumably because of their ability to secrete the enzyme penicillinase. The cycloalkane moiety of our novel compounds have the carbon skeleton of a monocyclic cyclohexane or a cyclohexane bridged by a methylene or substituted methylene radical. These latter moieties are thus bicyclo-[2.2.1]-cycloheptanes or norboranes as named according to the American Chemical Society "Nomenclature for Terpene Hydrocarbons," Report 14 (March 1955). Also embraced by our invention are the monounsaturated analogs of the foregoing wherein a double bond is present in the γ position to the carboxylic acid (or between the 3 and 4 position of the cyclohexane ring numbering from the carbon atom to which the carboxylic acid is attached). There may be additional substitution present in the cyclohexane ring (or cyclohexene ring) in either of the positions adjacent to the carboxylic acid moiety, namely position 2 or 6, with the limitation that there is no substitution in position 2 when said position is bridged with position 5 via a methylene or 2-propylidene group.

Particularly advantageous embodiments of our invention are those compounds wherein X represents phenyl, and W and Y represent hydrogen.

The bicyclo and cycloalkane moieties embraced by our invention can exist in several stereoisomeric configurations. Thus for example, the carboxyamido group may lie exo or endo with respect to the methylene bridge group of the norbornane ring system. Similarly the group W may lie exo or endo to the norbornane ring system. The cyclohexane and cyclohexene derivatives of the present invention embraced both the cis and trans isomers when such as possible. These various isomers are preferably prepared by isolation and use of the appropriate isomer of acid represented by Formula III. These various isomeric forms discussed above demonstrate antimicrobial activity and all such forms are envisioned as being within the scope of the instant invention and are embraced in the structural formulas presented herein and in the appended claims.

Several of requisite norbornene carboxylic acids employed in our invention are known and available to the art. Others may be prepared according to a standard Diels-Alder condensation employing the appropriately substituted dienophile and 1,3-cyclopentadiene or 5,5-dimethyl-1,3-cyclopentadiene. This procedure is also applicable for the preparation of the various cyclohex-3-ene carboxylic acids by substituting a 1,3-butadiene for 1,3-cyclopentadiene.

The nature of our invention is further typified by the following examples; however these examples should not in any way be construed as limiting the scope of our invention.

*Example 1*

A. To 350 ml. of a three molar ethereal solution of methylmagnesium bromide is added an additional 150 ml. of anhydrous ether and the mixture cooled below 10°. There is then added with stirring a solution of 132.2 g. (0.1 mole) of redistilled cinnamaldehyde in 120 ml. of anhydrous ether. The rate of addition is adjusted so that the temperature is maintained below 10° and a stream of nitrogen is passed through the reaction vessel. When the addition is complete (approximately 1.5 hours), the reaction mixture is removed and added over a 10 minute period without cooling but with agitation to 350 ml. of 30% sulfuric acid. The resultant mixture is heated at reflux for an additional 10 minutes and the layers then cooled and separated. The ethereal portion is washed successively with water, 5% aqueous sodium hydroxide solution, saturated aqueous ammonium chloride solution, and finally with water. The washed solution is dried over magnesium sulfate and the solvent evaporated on a steam bath. Distillation in vacuo of the residual oil yields 1-phenyl-1,3-butadiene.

B. To 59.6 g. (0.46 mole) of 1-phenyl-1,3-butadiene is added 1 g. of hydroquinone and 36 g. (0.05 mole) of freshly distilled acrylic acid. The mixture is allowed to stand at room temperature for 30 days and at the end of this time the mixture is filtered. The solid thus collected is slurried in hexane, refiltered and dried in vacuo to yield 2-phenylcyclohex-3-ene carboxylic acid.

C. A mixture of 45.3 g. (0.233 mole) of 2-phenylcyclohex-3-ene carboxylic acid and 500 mg. of platinum oxide in 150 ml. of ethyl acetate is treated with hydrogen at an initial pressure of 50 p.s.i. with sufficient heat to dissolve the acid. Upon the uptake of the theoretical amount of hydrogen, the container is removed from the hydrogenation apparatus and the mixture filtered. Concentration of the filtrate under reduced pressure then yields a solid which is triturated with 200 ml. of hexane, refiltered and dried to yield 2-phenylcyclohexane carboxylic acid.

*Example 2*

A solution of 7.0 g. (0.035 mole) of 2-phenylcyclohex-3-ene carboxylic acid and 25 ml. of thionyl chloride is allowed to stand at room temperature for 15 hours. The excess thionyl chloride is removed under reduced pressure and the resultant solid washed with cold heptane and dried to yield 2-phenylcyclohex-3-ene carboxylic acid chloride.

A solution of 7.75 g. (0.035 mole) of this acid chloride in 35 ml. of acetone is added with stirring to a solution of 3.24 g. (0.015 mole) of 6-aminopenicillanic acid in 190 ml. of aqueous sodium bicarbonate and 120 ml. of acetone. The mixture is stirred for one-half hour and then extracted with 3 portions of 150 ml. of ether. The residual aqueous phase is cooled to 5° C. and adjusted to pH 2.0 by the addition of dilute hydrochloric acid. This acidic solution is then extracted twice with 35 ml. portions of amyl acetate and the combined amyl acetate extracts dried over sodium sulfate and filtered. To the filtrate is added 10 ml. of triethylamine and the mixture stirred, cooled and filtered to yield 6-(2-phenylcyclohex-3-enylcarboxyamido)-penicillanic acid as the triethylamine salt. This product is further purified by recrystallation from a chloroform-ether solution. Treatment of this triethylamine salt with hydrogen chloride then yields the coresponding free acid 6-(2-phenylcyclohex-3-enyl-carboxyamido)-penicillanic acid.

Similarly by use of 2-phenylcyclohexane carboxylic acid in this procedure is obtained the compound 6-(2-phenylcyclohexanylcarboxyamido)-penicillanic acid.

*Example 3*

By employing 31.3 g. of 1,3-pentadiene in part B of Example 1, there is obtained the compound 2-methyl-cyclohex-3-ene carboxylic acid which is employed in the procedure of Example 2 to yield 6-(2-methylcyclohex-3-enylcarboxyamido)-penicillanic acid. Similarly by employing 1,3-hexadiene and 6-methyl-1,3-hexadiene in part B of Example 1, there are obtained the intermediates 2-ethylcyclohex-3-ene carboxylic acid and 2-isopropylhex-3-ene carboxylic acid, which when subjected to the procedure of Example 3 yields the compounds 6-(2-ethyl-cyclohex-3-enylcarboxyamido)-penicillanic acid and 6-(2-isopropylcyclohex-3-enylcarboxyamido)-penicillanic acid.

Likewise the following compounds are subjected to the procedure of part C of Example 1: 2-methylcyclohex-3-enecarboxylic acid, 2-ethylcyclohex-3-ene carboxylic acid, and 2-isopropylcyclohex-3-ene carboxylic acid. There are thus obtained upon the steps therein described the compounds 2-methylcyclohexane carboxylic acid, 2-ethylcyclohexane carboxylic acid and 2-isopropylcyclohexane carboxylic acid. By employing these 2-substituted cyclohexane carboxylic acids in the procedure of Example 2, there are thus obtained the following compounds: 6 - (2 - methylcyclohexanylcarboxyamido)-penicillanic acid, 6-(2-ethylcyclohexanylcarboxyamido)-penicillanic acid and 6-(2-isopropylcyclohexanylcarboxyamido)-penicillanic acid.

*Example 4*

To 24.8 g. (0.46 mole) of 1,3-butadiene is added 1 g. of hydroquinone and 7.5 g. (0.05 mole) freshly distilled cinnamic acid in 200 ml. of anhydrous toluene and the mixture heated at reflux for 40 hours. The solution is then cooled and the mixture extracted with 5% sodium bicarbonate. These aqueous extracts are in turn washed with ether and acidified by the addition of hydrochloric acid. The solid which thus forms is collected by filtration and dried to yield 6-phenylcyclohex-3-ene carboxylic acid.

By substituting 4.3 g. of methyl acrylic acid and 6.9 g. of 2-hexenoic acid for cinnamic acid in the above procedure, there are thus obtained the compounds 6-methyl-cyclohex-3-ene carboxylic acid and 6-propylcyclohex-3-ene carboxylic acid.

*Example 5*

To 60 g. (0.46 mole) of 1-phenyl-1,3-butadiene is added 1 g. of hydroquinone and 7.5 g. (0.05 mole) of freshly distilled cinnamic acid. The mixture is allowed to stand at room temperature for 30 days and at the end of this time the solid which has thus formed is collected by filtration, slurried several times with hexane and dried to yield 2,6-diphenylcyclohex-3-ene carboxylic acid. This compound is reduced according to the procedure of Example 1, part C to yield 2,6-diphenylcyclohexane carboxylic acid.

Similarly, equivalent amounts of methyl acrylic acid and 2-pentenoic acid are substituted for cinnamic acid in the above procedure to yield the compound 2-phenyl-6-methylcyclohex-3-ene carboxylic acid and 2-phenyl-6-ethylcyclohex-3-ene carboxylic acid.

*Example 6*

A solution of 7.0 g. (0.035 mole) of 6-phenylcyclohex-3-ene carboxylic acid and 25 ml. of thionyl chloride are allowed to stand at room temperature for 15 hours. The excess thionyl chloride is removed under reduced pressure and the solid collected by filtration and washed with cold heptane to yield 6-phenylcyclohex-3-ene carboxylic acid chloride.

A solution of 8.24 g. (0.035 mole) of 6-phenylcyclo-hex-3-ene carboxylic acid chloride in 35 ml. of acetone is added with stirring to a solution of 3.24 g. (0.015 mole) of 6-aminopenicillanic acid in 190 ml. of aqueous sodium bicarbonate and 120 ml. of acetone. The mixture is stirred for one-half hour and then extracted with 3 portions of 150 ml. of ether. The residual aqueous phase is cooled to 5° C. and adjusted to pH 2.0 by the addition of dilute hydrochloric acid. This acidic solution is then extracted twice with 35 ml. of amyl acetate and the combined amyl acetate extracts dried over sodium sulfate and filtered. To the filtrate is added 10 ml. of triethylamine and the mixture is then stirred, cooled and filtered to yield 6-(6-phenylcyclohex-3-enylcarboxyamido)-penicillanic acid triethylamine salt. Treatment of this compound with hydrogen chloride then yields the free acid, 6-(6-phenylcyclohex-3-enylcarboxyamido)-penicillanic acid.

In a similar manner by substituting in the above procedure equivalent amounts of the compounds, 6-methylcyclohex-3-ene carboxylic acid, 6-ethylcyclohex-3-ene carboxylic acid and 2,6-diphenylcyclohex-3-ene carboxylic acid, there are respectively obtained the compounds 6-(6-methylcyclohex-3-enylcarboxyamido)-penicillanic acid, 6-(6-ethylcyclohex-3-enylcarboxyamido)-penicillanic acid and 6-(2,6-diphenylcyclohex-3-enylcarboxyamido)-penicillanic acid.

*Example 7*

A solution of 8 g. of 3-phenyl-5-norbornene 2-carboxylic acid and 25 ml. of thionyl chloride is allowed to stand at room temperature for 15 hours. The excess reagent is then removed and the solid collected by filtration and washed with a small amount of cool heptane to yield 3-phenyl-5-norbornene 2-carboxylic acid chloride.

To a stirred solution of 4.32 g. (0.02 mole) of 6-aminopenicillanic acid in 230 ml. of 3% aqueous sodium bicarbonate solution and 150 ml. of acetone is added in a dropwise fashion over a 15 minute period a solution of 6.3 g. (0.02 mole) of 3-phenyl-5-norbornene 2-carboxyl chloride in 50 ml. of acetone. The mixture is then stirred for one hour and extracted three times with ether. The aqueous phase is cooled to 10°, adjusted to pH 2 and extracted with methylisobutyl ketone. These extracts are washed with water and dried over sodium sulfate. Twenty-two milliliters of a one molar solution of potassium 2-ethylhexanoate in isopropanol are next added followed by several volumes of ether. The mixture is cooled and filtered and the solid product triturated with chloroform and ether. The solid is collected and dissolved in acetone and filtered to remove any insoluble material and ether is then added to the filtrate. The solid which then forms is collected by filtration and dried to yield 6-(3-phenyl-5-norbornen-2-yl-carboxyamido)-penicillanic acid as the potassium salt. Treatment of this product with acid then yields the corresponding free acid.

*Example 8*

5-norbornene-2-carboxylic acid (5.1 g.) is employed in the procedure of Example 7 and upon execution of the steps therein described employing equivalent amount of the bicyclo compounds, there is obtained the compounds 6-(5-norbornen-2-yl-carboxyamido)-penicillanic acid.

In a similar fashion by employing
3-methyl-5-norbornene-2-carboxylic acid,
3-methylnorbornane-2-carboxylic acid,
3-ethylnorbornane 2-carboxylic acid,
3-phenylnorbornane 2-carboxylic acid and
norbornane 2-carboxylic acid
in the procedure of Example 7, there are obtained the following compounds:
6-(3-methyl-5-norbornen-2-yl-carboxyamido)-penicillanic acid,
6-(3-methylnorbornan-2-yl-carboxyamido)-penicillanic acid,
6-(3-ethylnorbornan-2-yl-carboxyamido)-penicillanic acid,
6-(3-phenylnorbornan-2-yl-carboxyamido)-penicillanic acid, and
6-(norbornan-2-yl-carboxyamido)-penicillanic acid.

*Example 9*

To 33 g. (0.5 mole) of cyclopentadiene is added 6.5 g. (0.05 mole) of 2-heptenoic acid in 200 ml. of toluene. The mixture is refluxed for 60 hours and at the end of this time cooled and extracted with aqueous sodium bicarbonate. These aqueous extracts are in turn washed with ether and acidified with hydrochloric acid. The solid which thus forms is collected by filtration and dried to yield 3-butyl-5-norbornene 2-carboxylic acid.

A solution of 6 g. of 3-butyl-5-norbornene 2-carboxylic acid and 25 ml. of thionyl chloride is allowed to stand overnight. The excess thionyl chloride is then removed under reduced pressure and the residual solid washed with cold hexane to yield 3-butyl-5-norbornene-2-carboxylic acid chloride.

3-butyl-5-norbornene-2-carboxylic acid chloride (4.56 g.) is dissolved in 50 ml. of acetone and added dropwise over a 15 minute period to a solution of 4.32 g. of 6-aminopenicillanic acid in 230 ml. of 3% aqueous sodium bicarbonate solution and 150 ml. of acetone. The mixture is stirred for one hour and extracted three times with ether. The aqueous phase is cooled to 10°, adjusted to pH 2 and extracted with methylisobutyl ketone. These extracts are washed with water and dried over sodium sulfate. A one molar solution of potassium 2-ethylhexanoate in isopropanol is prepared and 22 ml. of this solution is added to the dried extracts, followed by several volumes of ether. The mixture is cooled and filtered and the solid triturated with ether and chloroform. The solid is collected and dissolved in acetone. The mixture is filtered and ether is then added to the filtrate. The solid which then forms is collected by filtration and dried to yield 6-(3-butyl-5-norbornen-2-yl-carboxyamido)-penicillanic acid as the potassium salt. This salt may be converted to the free acid as heretofore described.

*Example 10*

7,7-dimethyl-5-norbornene 2-carboxylic acid is substituted for 3-phenyl-5-norbornene 2-carboxylic acid in the procedure of Example 7. Upon execution of the steps therein described employing equivalent amounts of the norbornene compounds, there is obtained 6-(7,7-dimethyl-5-norbornen-2-yl-carboxyamido)-penicillanic acid.

Other 7,7-dimethyl-5-norbornene 2-carboxylic acids are prepared according to the procedure of Example 9. Hence by substituting equivalent amounts of 5,5-dimethyl-1,4-cyclopentadiene for cyclopentadiene and cinnamic acid for 2-heptenoic acid and executing the procedure therein described, there is obtained the compound 3-phenyl-7,7-dimethyl-5-norbornene 2-carboxylic acid which is then converted to the acid chloride and thence allowed to react with 6-aminopenicillanic acid as therein described to yield 6-(3-phenyl-7,7-dimethylnorbornen-2-yl-carboxyamido)-penicillanic acid.

*Example 11*

One gram of 6-(2-phenylcyclohex-3-enylcarboxyamido)-penicillanic acid is dissolved in excess amyl acetate and to this solution is added 10 g. of N-ethylpiperidine. The solution is stirred for 30 minutes and the crystals which form by standing are collected by filtration and dried to yield the N-ethylpiperidine salt of 6-(2-phenylcyclohex-3-enylcarboxyamido)-penicillanic acid.

*Example 12*

One gram of 6-(3-phenyl-5-norbornen-2-yl-carboxyamido)-penicillanic acid is dissolved in excess amyl acetate and to this solution 10 g. of triethylamine are added. The solution is stirred for 30 minutes and the crystals which form upon standing are collected by filtration and dried to yield the triethylamine salt of 6-(3-phenyl-5-norbornen-2-yl-carboxyamido)-pencillanic acid.

What is claimed is:

1. Compounds of the formula:

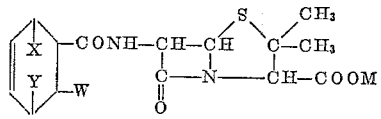

wherein

W is selected from the group consisting of hydrogen and phenyl;
X is selected from the group consisting of hydrogen, lower alkyl, phenyl and when taken together with Y, methylene and 2-propylidene;
Y is selected from the group consisting of hydrogen and when taken together with X methylene and 2-propylidene, at least one of W, X and Y being a group other than hydrogen; and
M is selected from the group consisting of hydrogen and the cation ion form of a member selected from the group consisting of sodium, potassium, calcium, aluminum, lower alkyl amine, procaine, chloroprocaine, N,N'-dibenzylethylenediamine, N,N'-bis-(dehydroabietyl)-ethylenediamine, and N-methyl-1,2-diphenyl-2-hydroxyethylamine.

2. A compound of the formula:

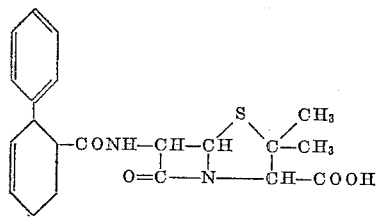

3. A compound of the formula:

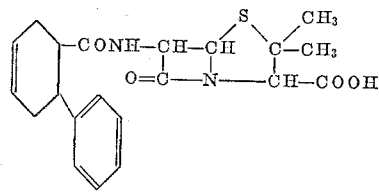

4. A compound of the formula:

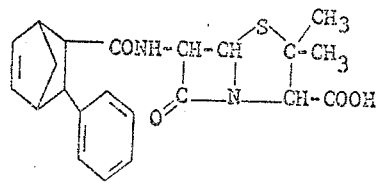

5. A compound of the formula:

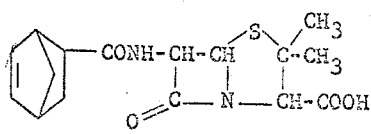

6. A compound of the formula:

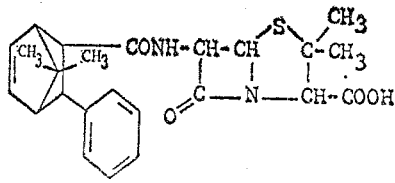

References Cited in the file of this patent
UNITED STATES PATENTS
2,941,995    Doyle et al. _____ June 21, 1960